United States Patent
Hanser et al.

(10) Patent No.: US 7,857,361 B1
(45) Date of Patent: Dec. 28, 2010

(54) COUPLER ASSEMBLY

(75) Inventors: Paul Edmund Hanser, Tipton, IA (US);
Marc Frerichs, Eldridge, IA (US);
Joshua Jay Gnewuch, Iowa City, IA (US)

(73) Assignee: HWH Corporation, Moscow, IA (US)

( * ) Notice: Subject to any disclaimer, the term of this patent is extended or adjusted under 35 U.S.C. 154(b) by 212 days.

(21) Appl. No.: 11/742,673

(22) Filed: May 1, 2007

(51) Int. Cl.
*F16L 21/06* (2006.01)

(52) U.S. Cl. .......................... 285/322; 285/35; 285/91; 285/314; 285/396

(58) Field of Classification Search .................. 285/314, 285/35, 308, 315, 316, 322, 323, 324, 361, 285/395, 396, 91, 34
See application file for complete search history.

(56) References Cited

U.S. PATENT DOCUMENTS

| | | | | |
|---|---|---|---|---|
| 1,006,190 A | * | 10/1911 | Estell et al. | 285/34 |
| 2,098,514 A | * | 11/1937 | Nord | 285/102 |
| 2,327,714 A | * | 8/1943 | Iftiger, Sr. | 285/35 |
| 2,388,179 A | * | 10/1945 | Prowd | 285/35 |
| 2,684,839 A | * | 7/1954 | Rice | 173/126 |
| 2,784,987 A | * | 3/1957 | Corcoran | 285/82 |
| 3,168,333 A | * | 2/1965 | Dziura | 285/35 |
| 3,394,950 A | * | 7/1968 | Jensen | 285/35 |
| 3,724,882 A | * | 4/1973 | Dehar | 285/243 |
| 4,192,347 A | | 3/1980 | Richard | |
| 4,444,223 A | | 4/1984 | Maldavs | |
| 4,566,489 A | | 1/1986 | Knapp et al. | |
| 4,787,907 A | | 11/1988 | Carignan | |
| 5,503,437 A | | 4/1996 | Cronley | |
| 5,580,099 A | * | 12/1996 | Eaton | 285/35 |
| 5,649,723 A | * | 7/1997 | Larsson | 285/34 |
| 5,788,289 A | | 8/1998 | Cronley | |
| 6,059,336 A | | 5/2000 | Meronek | |
| 6,302,447 B1 | * | 10/2001 | Lee | 285/86 |
| 6,786,516 B2 | * | 9/2004 | Cronley | 285/322 |

* cited by examiner

*Primary Examiner*—James M Hewitt
*Assistant Examiner*—Gwendolyn D Fournet
(74) *Attorney, Agent, or Firm*—Jason R. Sytsma; Shuttleworth & Ingersoll, PLC

(57) ABSTRACT

A coupler for connecting and disconnecting a first hydraulic connector and a second hydraulic connector. The coupler has a first end and a second end. The coupler first end has a threaded opening adapted to combine with a threaded connector. The coupler second end has an opening with several members movable relative to the longitudinal axis of the coupler. The movable members have a first position wherein they are moved outward to make the opening larger and a second position wherein they are moved inward to make the opening smaller. The opening in the coupler second end is adapted to receive a threaded connector when the movable members are in their first (larger) position. After a portion of the threaded connector is inserted into the opening, the members are moved to their second (smaller) position thereby securing the threaded connector to the coupler second end.

10 Claims, 4 Drawing Sheets

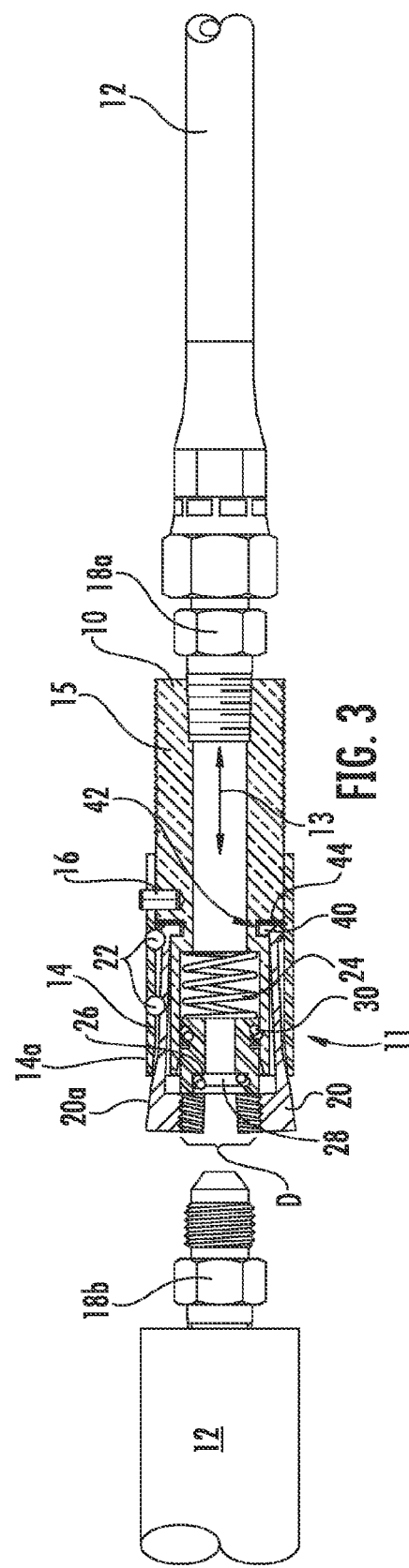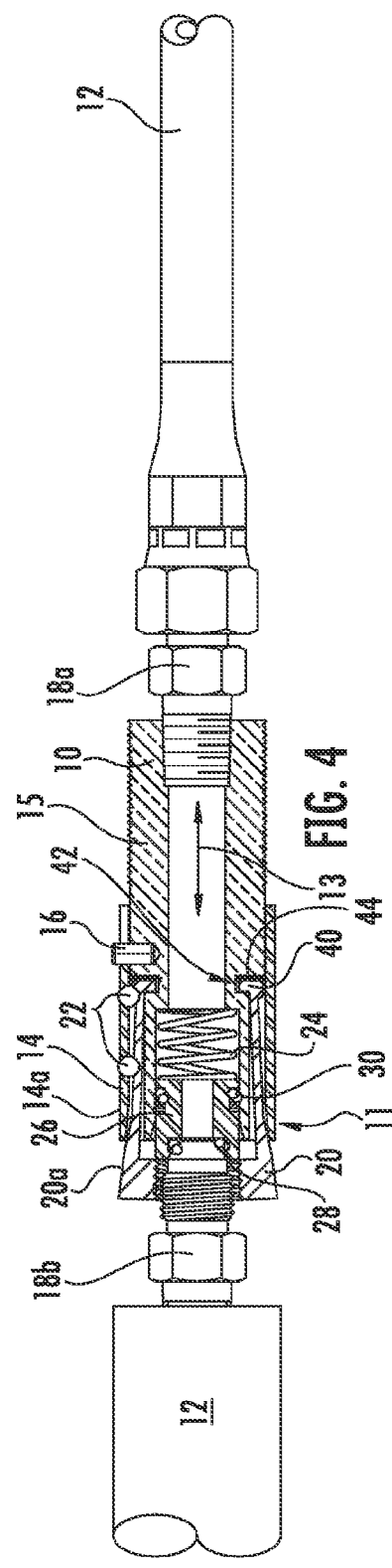

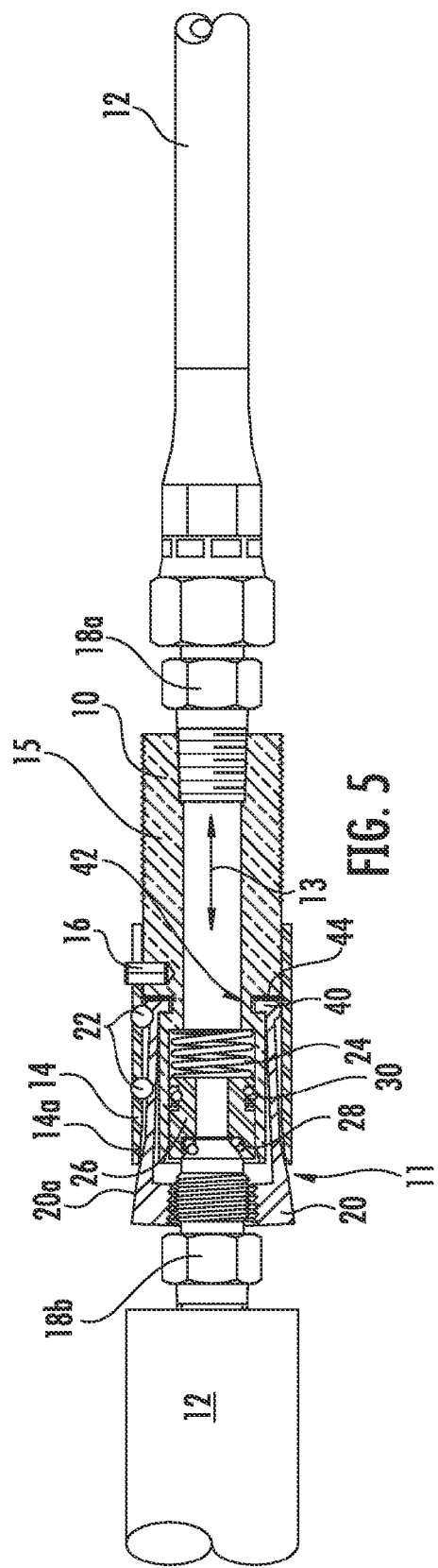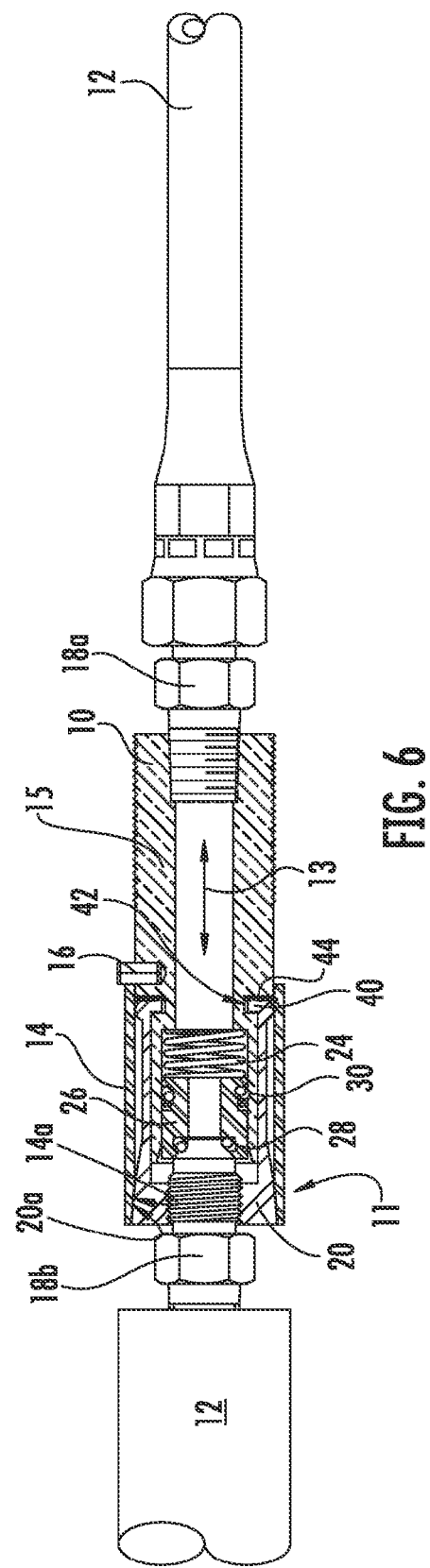

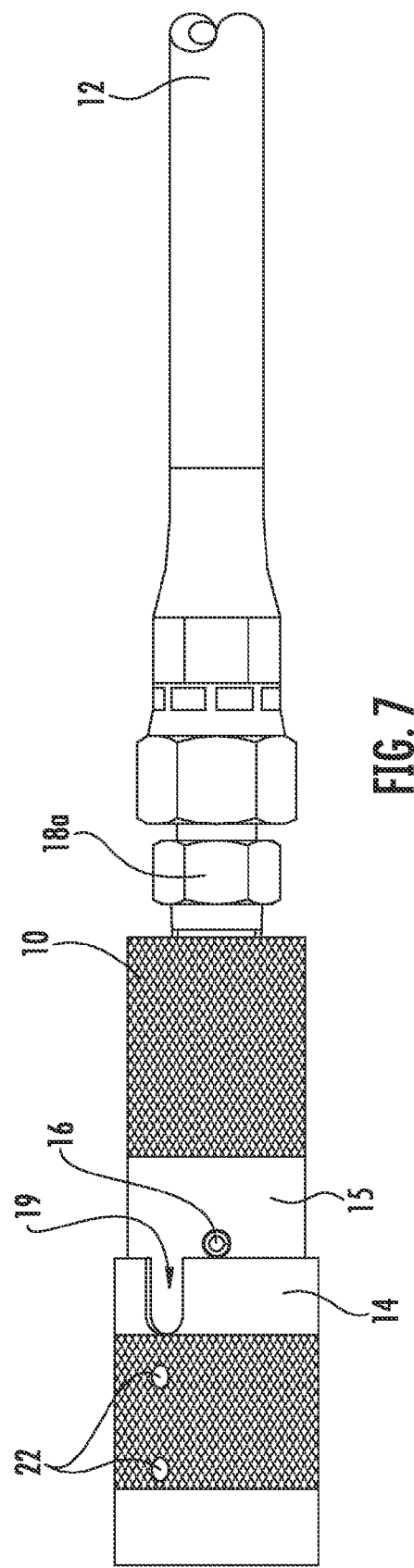

COUPLER ASSEMBLY

BACKGROUND OF THE INVENTION

The invention relates to a quick connect/disconnect coupler for hoses or other components.

Hydraulic systems typically comprise components such as hoses, pumps, tanks, and devices powered by the hydraulic system. These components are combined using connectors such as flared fittings. Traditionally, a first connector is combined with a first component and a second connector is combined with a second component. The first connector comprises a male threaded portion and the second connector comprises a female threaded portion. The connector having the male portion is received by the connector having the female portion and the two connectors are screwed together to attach the components.

One problem with this traditional means for connecting hydraulic components is that it is time consuming and labor intensive to screw and unscrew the connectors. This is particularly disadvantageous when it is desirable to quickly connect and disconnect hydraulic hoses. For example, a manufacturer may want to test its hydraulic components before they are shipped. In doing so, the manufacturer may need to connect and disconnect many different hydraulic devices to and from a hydraulic system every day. Therefore, there is a need for a coupler adapted to quickly connect and disconnect components in a hydraulic system without the tedious task of screwing and unscrewing the threaded connectors.

SUMMARY OF THE INVENTION

The present invention comprises a coupler for quickly connecting and disconnecting a first hydraulic connector and a second hydraulic connector. The first and second hydraulic connectors may be combined with hydraulic components such as hoses or other suitable hydraulic devices. The coupler comprises a first end and a second end. Each end comprises an opening. The openings are combined by an internal cavity that is adapted to allow fluid to flow between the first end and the second end of the coupler.

The opening in the coupler first end is adapted to combine with a connector by any suitable means. The opening in the coupler second end comprises several threaded members that extend from the coupler second end. The members are movable relative to the longitudinal axis of the coupler. The members comprise a first position wherein they are moved outward to make the opening larger and a second position wherein they are moved inward to make the opening smaller. The opening in the coupler second end is adapted to receive a threaded connector when the movable members are in their first (larger opening) position. The diameter of the opening when the members are in their first position is larger than the diameter of the connector thereby allowing the connector to easily fit inside the opening. After a portion of the threaded connector is inserted into the opening, the members are moved to their second (smaller opening) position wherein the external threads on the connector mate with the internal threads on the movable members thereby securing the threaded connector to the coupler second end.

In one embodiment, the movable members are moved between their first position and their second position by a sleeve that is movable along the length of the coupler. The sleeve has a retracted position wherein it is moved away from the coupler second end and an extended position wherein it is moved toward the coupler second end. The diameter of the sleeve is smaller than the diameter of the members when the members are in their first position so that as the sleeve is moved to its extended position, it engages the outer surface of the members and forces them to move to their second position.

BRIEF DESCRIPTION OF THE DRAWING

FIG. 3 is a cross sectional view of an embodiment of the invention taken along section lines A-A of FIG. 2 showing the sleeve in its retracted position wherein it is moved away from the coupler second end;

FIG. 4 is a cross sectional view similar to FIG. 3 but showing the connector partially inserted into the opening in the coupler's second end;

FIG. 5 is a cross sectional view similar to FIG. 4 but showing the connector compressing the spring/piston assembly;

FIG. 6 is a cross sectional view of an embedment of the invention showing the sleeve in its second position and the members in their second position securing the connector to the coupler second end; and FIG. 7 is a side view of an embodiment of the invention showing the sleeve in its extended and locked position.

DETAILED DESCRIPTION OF THE INVENTION

Figure 1:
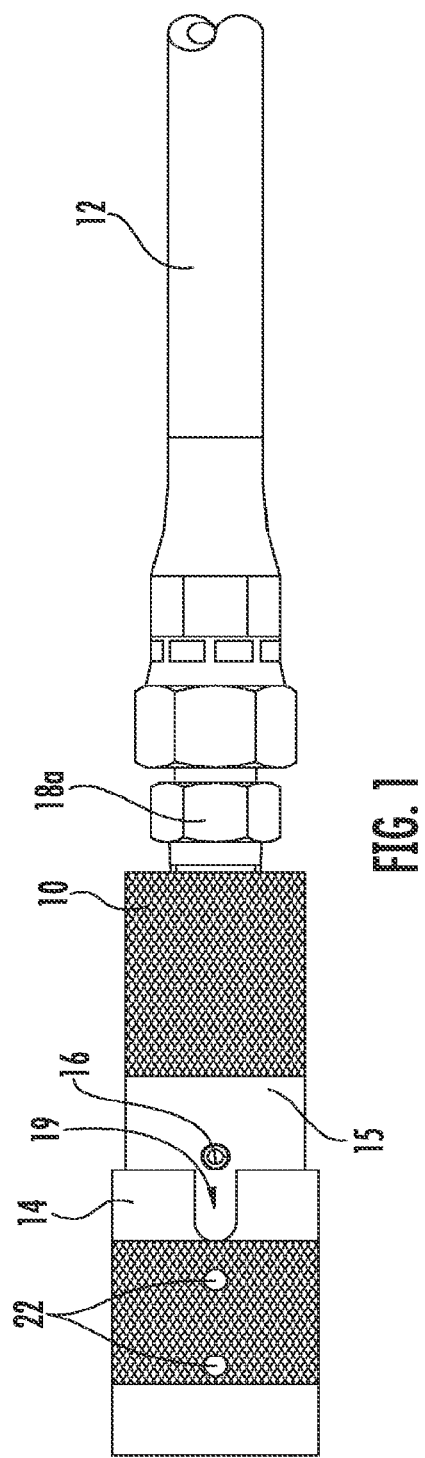
FIG. 1 is a side view of an embodiment of the invention showing the sleeve in its extended position wherein it is moved toward the coupler second end.

As seen best in FIGS. 3-6, the present invention comprises a coupler for quickly connecting and disconnecting a first hydraulic connector 18a and a second hydraulic connector 18b. The first and second hydraulic connectors 18a, 18b may be attached to components such as hoses 12 or other suitable hydraulic devices. The coupler comprises a body 15 having first end 10 and a second end 11. Openings at each end 10, 11 are combined by an internal cavity 13 that is adapted to allow fluid to flow between the coupler first end 10 and the coupler second end 11. It should be noted that although the invention is described herein as being used in a hydraulic system with hydraulic fluid, any other suitable system and fluid may be used.

As shown in FIGS. 3-6, the coupler first end 10 comprises a threaded opening adapted to combine with a threaded connector 18a by any suitable means, including conventional means such as screwing a portion of the threaded connector 18a to a portion of the threaded coupler first end 10. As noted above, the connector 18a may be combined with a hydraulic hose 12 or any other suitable hydraulic device. In an alternate embodiment, the coupler first end 10 may comprise a quick connect/disconnect means like the one described below so that the coupler has a quick connect/disconnect means at each end 10, 11.

Figure 2:
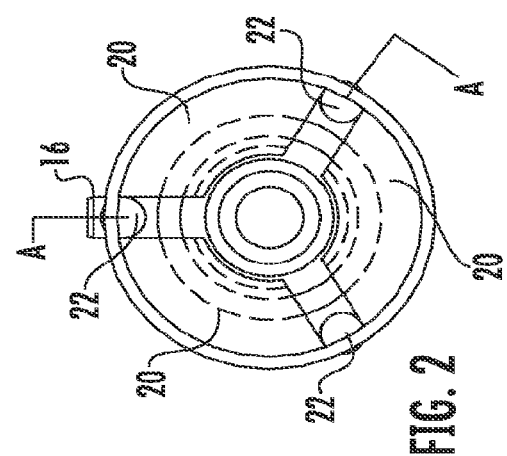
FIG. 2 is an end view of an embodiment of the invention showing the movable members that comprise the opening in the coupler second end wherein the movable members are in their second position.

As shown in FIGS. 2 and 3, the coupler second end 11 comprises an opening having several members 20 movable relative to the longitudinal axis of the coupler. The members 20 comprise threads on their internal surfaces adapted to mate with the threads on the outer surface of the connector 18b. The members 20 comprise a first position wherein they are moved outward to make the opening larger and a second position wherein they are moved inward to make the opening smaller.

In one embodiment shown in FIGS. 3-6, the members 20 are pivotally combined with the coupler. In this embodiment, the members 20 comprise a flange 40 that is received by an opening or groove 42 in the coupler body 15. The sleeve 14 holds the flange 40 in the groove 42 by limiting the distance the members 20 can travel. The flange 40/groove 42 assembly combines the members 20 to the coupler while still allowing the members 20 to pivot between their first and second position. It is important that the groove 42 is not too narrow because a narrow groove 42 could cause the flanges 40 to bind as the members 20 are pivoted. An elastomer washer 44 may be inserted in the groove 42 between the flanges 40 and the wall of the groove 42. The elastomer washer 44 provides a means for taking up some of the space in the groove 42 to help the members 20 stay aligned without requiring the groove 42 to be too narrow.

In some embodiments, the movable members 20 are biased in their first (larger opening) position. As shown in FIGS. 3 and 4, the elastomer washer 44 puts more pressure on the terminal end of the flanges 40 because the flanges 40 tapers toward the washer 44 at their terminal end. The tapering of the flanges 40 results in added pressure on the flanges' 40 terminal end which causes the members 20 to pivot toward and be biased in their first position.

The opening in the coupler second end 11 is adapted to receive a threaded connector 18b when the movable members 20 are in their first position. This is shown in FIG. 4 wherein the threaded portion of the connector 18b is partially inserted into the opening in the coupler second end 11. The diameter D of the opening in its first position is larger than the diameter of the threaded portion of the connector 18b so that the connector 18b easily fits inside the opening. As shown in FIG. 6, after a portion of the connector 18b is inserted into the opening, the members 20 are moved to their second (smaller opening) position wherein the threads on the connector 18b mate with the threads on the movable members 20 thereby securing the threaded connector 18b to the coupler second end 11.

The members 20 are moved between their first position and their second position by an engaging element. In one embodiment, the engaging element is a sleeve 14 that is movable along the length of the coupler. The sleeve 14 has a first (retracted) position wherein it is moved away from the coupler second end 11 and a second (extended) position wherein it is moved toward the coupler second end 11. FIGS. 1, 6, and 7 show the sleeve 14 in its extended position and FIGS. 3, 4, and 5 show the sleeve 14 in its retracted position. As shown in FIG. 3, the diameter of the sleeve 14 is smaller than the diameter of the members 20 in their first position. As shown in FIG. 6, as the sleeve 14 is moved to its extended position, the sleeve 14 engages the outer surface of the members 20 and forces them to move to their second position wherein the opening has a diameter smaller than D.

The diameter of the opening in the coupler second end 11 after the members 20 has been moved to their second position approximates the diameter of the threaded end of the connector 18b so that the threads on the inside portion of the members 20 mate with the threads on the outer surface of the connector 18b. In one embodiment, the diameter of the opening after it has been moved to its second position is such that the connector 18b can be screwed in and out of the opening in the same manner that the connector 18a can be screwed in and out of the opening in the connector first end 10.

After the sleeve 14 has been moved to its extended position (FIG. 6) to secure the connector 18b in the opening, it is important that the sleeve 14 remain in its extended position until the user decides it is time to remove the connector 18b from the coupler. If the sleeve 14 were to move to its retracted position unexpectedly causing the connector 18b to be released from the coupler, hydraulic fluid could leak from the coupler. To prevent this, the coupler may comprise any suitable locking means to secure the sleeve 14 in its extended position. An example of one type of locking means is shown in FIGS. 1 and 7 wherein the sleeve 14 comprises a slot 19 and the coupler comprises a stopper member 16. The slot 19 allows the sleeve 14 to travel between its retracted and extended positions when aligned with the stopper member 16 as shown in FIG. 1. However, as shown in FIG. 7, after the sleeve 14 has been moved to its extended position, the sleeve 14 can be rotated so that the stopper member 16 is no longer in alignment with the slot 19. In its rotated position, the sleeve 14 is locked in its extended position because the stopper member 16 prevents the sleeve 14 from moving back to its retracted position.

Other locking means may be used to secure the sleeve 14 in its extended position, either in addition to or separate from the member 16/slot 19 locking means described above. One such locking means uses friction between the sleeve 14 and the members 20 to secure the sleeve 14 in its extended position. As seen best in FIGS. 4 and 6, the sleeve 14 comprises a female tapered portion 14a and the members 20 comprise a male tapered portion 20a. As the sleeve 14 approaches its extended position, the taper 14a on the sleeve 14 forms a close fit with the taper 20a on the members 20 which frictionally locks the two components together. This friction lock is similar to a Morse Taper that is known in the art and described generally in U.S. Pat. No. 4,787,907 (Carignan), which is hereby incorporated by reference.

FIGS. 3-6 show that in some embodiments, the coupler comprises means to help create a fluid seal between the coupler second end 11 and the connector 18b. In one embodiment, the coupler comprises a spring 24 that biases a piston 26 in an extended position. The piston 26 comprises a seal 28 such as a rubber o-ring near one end. As shown in FIGS. 5 and 6, the spring 24 presses the piston 26/seal 28 assembly against the end of the connector 18b as the connector is inserted into the opening in the coupler second end 11 thereby forming a fluid seal between the connector 18b and the coupler.

In some embodiments, a fluid seal 30 is formed between the piston 26 and the coupler body 15. This seal 30 prevents fluid from leaking around the outer portion of the piston 26 since the piston 26 is movable within the coupler. This seal 30 is similar to the one described above in that it may comprise a rubber o-ring or any other suitable material.

In some embodiments, the members 20 are separated by spacers 22. The spacers 22 help align the members 20 so that the members 20 remain spaced apart at a predetermined distance. In the preferred embodiment, the members 20 are spaced an equal distance apart. The spacers 22 also help the members 20 to rotate as the sleeve 14 is rotated because the spacers 22 engage both the sleeve 14 and members 20. FIGS. 2 and 3 show one embodiment wherein the spacers 22 are metal balls and there are two spacers 22 between each of the three members 20. The spacers 22 are held in place in-between the members 20 by the sleeve 14. As seen in FIG. 1, the sleeve 14 may comprise small openings or grooves having a diameter smaller than the diameter of the spacers 22 to prevent the spacers 22 from completely passing through the openings. A portion of each spacer 22 is forced into its respective opening in the sleeve 14. It is this interference with the sleeve 14 that allows the spacers 22 to help rotate the members 20 as the sleeve 14 is rotated. In other words, the spacers 22 are engaged with the sleeve 14 since a portion of each spacer 22 is forced into an opening in the sleeve 14, and the spacers 22 are engaged with the members 20 since the spacers 22 are located in-between each member 20. Due to this orientation, rotation of the sleeve 14 causes movement of the spacers 22 which causes the members 20 to rotate. The rotation of the members 20 may be necessary to help to align the members 20 with the threads on the connector 18b.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. A coupler for detachably combining a first threaded connector and a second threaded connector, said coupler comprising:
    a body having a first end and a second end, said first and second ends each having an opening wherein the opening in the first end is adapted to combine with the first threaded connector and the opening in the second end is adapted to combine with the second threaded connector, said openings being connected by an internal cavity that is adapted to allow fluid to flow between the first and second ends;
    at least two pivoting members combined with the coupler second end, which pivoting members are pivotable between a first position wherein they are pivoted outward to make the second opening larger and a second position wherein they are pivoted inward to make the second opening smaller, the pivoting members comprise threads on their internal surfaces adapted to mate with the threads on the second threaded connector when the pivoting members are in their second position;
    a sleeve having a first position wherein the sleeve does not engage the pivoting members and a second position wherein the sleeve engages the pivoting members to move them from their first position to their second position;
    a spacer positioned between the pivoting members, wherein the spacer engages the sleeve and the pivoting members so that rotation of the sleeve causes rotation of the pivoting members;
    a stopper extending vertically from the outer surface of the coupler body; and
    a slot in the sleeve adapted to receive the stopper when slot is in axial alignment with the stopper, wherein when the sleeve is in the first position the stopper prevents rotation of the sleeve, and when the sleeve is in the second position the sleeve is rotated with respect to the stopper in order to prevent accidental axial movement of the sleeve with respect to the coupler body.

2. The coupler of claim 1 wherein the sleeve encompasses the coupler body.

3. The coupler of claim 2 wherein the sleeve has a diameter smaller than the diameter of the members when the members are in their first position so that as the sleeve moves to its second position to engage the members, the sleeve moves the members from their first position to their second position.

4. The coupler of claim 1, and further comprising a groove extending around the circumference of the body and positioned between the first and second ends; a flange at a distal end of the pivoting members pivotally positioned in the groove; and wherein the sleeve, the pivoting members and the spacer cooperate to restrict relative movement between them, wherein when the sleeve is in the first position the sleeve, the pivoting members and the spacer do not rotate with respect to the body, wherein when the sleeve moves toward the second position the sleeve urges the pivoting members into their second position to engage the second threaded connector, wherein when the sleeve is in the second position the sleeve, the pivoting members and the spacer rotate around the circumference of the body and only the sleeve constrains the pivoting members in their second position, and wherein to release the pivoting members from the second threaded, connector the sleeve is moved back axially to allow the pivoting members to pivot outward.

5. The coupler of claim 1 further comprising a seal assembly for fluidly sealing the second connector to the coupler second end.

6. The coupler of claim 5 wherein the seal assembly comprises a spring that biases a piston toward the coupler second end; and
    an o-ring combined with the piston;
    wherein the o-ring is adapted to engage a portion of the second connector so as to create a fluid seal between the second connector and the coupler.

7. The coupler of claim 1 wherein the spacers are spherical.

8. The coupler of claim 1 wherein the locking assembly comprises a tapered portion on the sleeve and a tapered portion on the members.

9. The coupler of claim 8 wherein the tapered portion on the sleeve frictionally interferes with the tapered portion on the members to form a Morse Taper which locks the sleeve in its second position and the members in their second position.

10. The coupler of claim 8 wherein the taper on the sleeve is a female taper and the taper on the members is a male taper.

* * * * *